(12) United States Patent
Nagaishi

(10) Patent No.: US 6,330,358 B1
(45) Date of Patent: Dec. 11, 2001

(54) APPARATUS FOR CHARACTER SEGMENTATION AND APPARATUS FOR CHARACTER RECOGNITION USING THE SAME

(75) Inventor: Michihiro Nagaishi, Kyoto (JP)

(73) Assignee: ATR Auditory and Visual Perception Research Laboratories, Kyoto (JP)

(*) Notice: Subject to any disclaimer, the term of this patent is extended or adjusted under 35 U.S.C. 154(b) by 0 days.

(21) Appl. No.: 08/425,319

(22) Filed: Apr. 17, 1995

Related U.S. Application Data

(63) Continuation-in-part of application No. 08/034,948, filed on Mar. 22, 1993, now abandoned, and a continuation-in-part of application No. 08/074,518, filed on Jun. 11, 1993, now Pat. No. 5,845,020.

(30) Foreign Application Priority Data

Jan. 14, 1993 (JP) .................................................... 5-005394

(51) Int. Cl.$^7$ ................................ G06K 9/34; G06K 9/68
(52) U.S. Cl. ......................... 382/178; 382/215; 382/218
(58) Field of Search ..................................... 382/173, 177, 382/178, 179, 182, 183, 320, 218, 282, 324, 201, 204, 215

(56) References Cited

U.S. PATENT DOCUMENTS

| | | |
|---|---|---|
| 3,818,446 | 6/1974 | Benson . |
| 3,874,586 | 4/1975 | Foote et al. . |
| 4,475,238 | 10/1984 | Everhart . |
| 4,528,692 | 7/1985 | Umeda et al. . |
| 4,797,938 * | 1/1989 | Will .......................................... 382/64 |
| 4,811,412 * | 3/1989 | Katsurada .............................. 382/57 |
| 4,906,940 | 3/1990 | Greene et al. . |

FOREIGN PATENT DOCUMENTS

WO 93/20532  10/1993 (WO) .

OTHER PUBLICATIONS

Michihiro Nagaishi, "Segmentation of Handwritten Characters Using Field of Induction on the Retina", with English Abstract, ATR Auditory and Visual Perception Research Laboratories, D–II vol. J76–D–II No. 9, pp. 1948–195, Sep. 1993.

Int. Joint Conf. on Neural Networks, vol. 1, Jul. 8, 1991, Seattle, WA, pp. 7–12, XP238261, A.L. Yuille et al "Particles tracking by deformable templates", Section "The deformable template".

Systems, Computers, Controls, vol. 3, No. 3, May 1972, Washington US, pp. 1–9, T. Kubota et al, "Handwritten character recognition using transformation by field", Section "5 Pattern transformation II—Case where standard pattern field exist" *Figs. 7–13*.

(List continued on next page.)

Primary Examiner—Jon Chang
(74) Attorney, Agent, or Firm—McDermott, Will & Emery

(57) ABSTRACT

Hand-written characters which have been turned to electronic data are input by input means, and fields of induction on the retina of the character image are calculated by field of induction estimating means. By using the fields of induction on the retina generated by the plurality of characters thus calculated, character region of each character is determined by character segmentation means, and individual characters are segmented from an array of characters. The field of induction on the retina of the segmented character is deformed to be matched with a field of induction on the retina of a character prepared in advance as a dictionary, and based on the magnitude of strain generated at the time of this deformation, difference between the fields of induction on the retina of different characters is evaluated quantitatively, and character recognition is carried out based on this estimation.

6 Claims, 10 Drawing Sheets

OTHER PUBLICATIONS

Pattern Recognition, vol. 5, No. 3, Sep. 1973, Elmsford, NY, pp. 175–197 B. Widrow The rubber–mask technique—I. Pattern measurement and analysis, Section 2. Chromosome analysis and classification *Figs. 3–7*.

International Journal of Computer Vision, vol. 8, No. 2, Aug. 1992, Norwell US pp. 89–111, XP306598, A.L. Tuille "Feature extraction from faces using deformable templates Section I. Introduction".

Identifying Ability of a Recognition Method Based on the Field of Induction, by Michihiro Nagaishi, Proc. International Conference on Document Analysis and Recognition, Tsukuba, Japan pp. 926–929 (1993, 10).

Nagaishi, "A Proposal of Character Recognition using the Theory of Field of Induction on the Retina, Technical Report of the Institute of Electronics Information and Communication Engineers," PRU2–46 (1992–11), Nov. 19, 1992.

Tsumiyama et al "Active Net: Active Net Model for Region Extraction", Nov. 16, 1989, pp. 1–8.

Kass et al "Snakes: Active Contour Models", Int. Journal of Computer Vision, pp. 321–331 (1988).

"Identifying Ability of a Recognition Method Based on the Field of Induction," by Michihiro Nagaishi, Proc. International Conference on Document Analysis and Recognition, Tsukuba, Japan, pp. 926–929 (1993, 10).

* cited by examiner (a)    (b)

APPARATUS FOR CHARACTER SEGMENTATION AND APPARATUS FOR CHARACTER RECOGNITION USING THE SAME

This application is a continuation-in-part of application Ser. No. 08/034,948 filed Mar. 22, 1993 now abandoned, and a continuation-in-part of application Ser. No. 08/074,518, filed Jun. 11, 1993 now U.S. Pat. No. 5,845,020.

BACKGROUND OF THE INVENTION

1. Field of the Invention

The present invention relates to an apparatus for character segmentation and to an apparatus for character recognition using the same. More specifically, the present invention relates to an apparatus for character segmentation in which hand-written characters are provided as inputs, characters are segmented from character data therefore and the result of segmentation are provided, and to an apparatus for character recognition for recognizing the segmented characters.

2. Description of the Background Art

FIG. 15 is a schematic block diagram showing a conventional apparatus for character recognition. Referring to FIG. 15, characters are turned into electronic data by input means 20, and, at first, segmented from a series of characters to separate characters by character segmentation means 21. Features of each segmented character are extracted by feature extracting means. Recognizing means 23 recognizes the character by calculating a distance between the feature which has been prepared in advance as a dictionary and the feature of the input character, based on the extracted feature. States of and results from input means 20, character segmentation means 21, feature extracting means 22 and recognizing means 23 are provided by output means 24.

Now, it is essential in any character recognizing system to segment separate characters from input character images. A Character recognizing system must have a character segmentation means of sufficiently high performance as well as a character recognizing means of similarly high performance.

Further, before segmentation of characters one by one, a plurality of characters (e.g. lines of characters) must be extracted from a document. Generally, when the document is written laterally, a region where characters exist is estimated from projection of character images in the vertical direction. Even in a case of a hand-written document, characters are written relatively linearly if the characters are written laterally, though one of characters may be inclined. Therefore, in most cases, characters can be correctly extracted from documents by using projections of document images. Even if the individual hand-written character is not neat and character components of different characters are overlapped, positions of the characters can be estimated fairly well from the projections in the document. There may be components of other characters in the characters extracted from hand-written document, however, at least the characters of the objective array of characters are included. Namely, in the prior art, characters including the objective character can be sufficiently extracted from the hand-written document.

Segmentation of characters is effected by checking presence/absence of the spacing of characters. Generally, when the characters are written laterally, gaps between projections of the images of characters in the horizontal direction are used as references, and characters are linearly segmented one-dimensionally. Since italic letters and the like are inclined by a prescribed angle, the direction of projection is changed variously when projection of character images are taken, and the projection at which the angle becomes most acute is employed to enable segmentation of characters employing the projection in the similar manner as in the case of segmentation of general characters. Compared with printed letters in which the spacing between characters is constant, adjacent characters are often very close to each other when the characters are hand-written. In such a case, there is no gap in the projection as represented for example by the projections of characters "会" and "上" shown in FIG. 3(a), and therefore the characters "会" and "宀" cannot be directly segmented based on the gap of projections. For this reason, processing such as forced character segmentation is carried out, assuming that the height of the array of characters represents the size of the character, utilizing the nature of Japanese that generally the height and width of a character are identical in most cases. In the example of FIG. 3(a), the gap between the character "会" and the character "宀" can be estimated. Using this gap as a reference, the characters "会" and "上" can be segmented.

If components of a character are spaced from each other as in the case of a character "宀" shown in FIG. 3(b), for example, the components of the character "宀" may possible be erroneously segmented as separate characters. Alternatively, the left side of the character "宀" may be segmented as a part of another character from the projection of FIG. 3(b). Therefore, the gap cannot be fully relied on as a gap between characters. Accordingly, a general method is also proposed in which portions tentatively segmented by using projections are labeled by using results of recognition and knowledge of words, and these portions are combined to find an optimal combination based on grammatical meaning to allow complete segmentation. The features of characters used in character recognition means strokes and the like which are basic components of characters and states of distribution of coordinate points when the characters are viewed as character images represented quantitatively as multidimensional vectors. These features are mainly conceived based on intuition of the designer of the character recognition system, and various and many features are employed in character recognition systems. Recognition is done based on the method of multivariate analysis of the multidimensional vectors obtained in this manner.

As for character segmentation, projections are exclusively used as described above. Namely, character segmentation and character recognition are separately carried out using completely different methods.

However, when the method of general determination employing results of recognition and knowledge of words is employed, the number of combinations to be examined will be very large and hence the time necessary for determination becomes very long. The larger the number of characters become, the longer the necessary time. In addition, the software for executing such determination is quite complicated as it must cope with exceptions in determination, so that much time and labor is necessary for producing such software.

If components of a Chinese character are segmented as separate portions, a left-hand radical and right-hand radical may possibly be treated as independent characters. In such a case, the components must be analyzed not only by grammatical knowledge but also by the context. Therefore, un even longer time is required for examination of the characters and extensive knowledge related to context is necessary to analyze all possible combinations. Especially in case of hand-written characters which are written very close with each other, the possibility of correct segmentation of individual characters by using projection is low, and therefore satisfactory results cannot easily be obtained unless optimal combinations of portions simply segmented are to be found.

When projections are used, segmentation is effected linearly. Therefore, if a character is forcefully separated at a character width estimated based on the height of the array, it is possible that component of other characters exist in the segmented character region, which leads to lower ratio of recognition.

It may helpful to change the direction of projection such as in the case of italic letters, to cope with the inclination of hand-written characters. However, different from printed characters, inclination of respective characters existing in the same array of characters is not constant even if the writer is the same. Further, the character are often rotated and buried. Therefore, it is difficult to correctly estimate the spacing of characters even if the direction of projection is changed variously.

As described above, since hand-written characters are in most cases written very close to each other, it is difficult to extract characters one-dimensionally by using projections even if other information such as knowledge of character context are employed for help.

Meanwhile, recognition and segmentation of characters are carried out through completely different processes. Therefore, different process steps must be prepared for respective processes, so that the whole system of character recognition becomes complicated. In addition, the types of result of character segmentation and of the result of character recognition are provided very much different from each other. For this reason, it is very difficult to determine what modification must be made on a quantity obtained as a result, when the result of one process is fed back to the other process for correcting an obtained result. In most cases, many candidates are picked up during segmentation and recognition of characters and the most appropriate candidates in view of grammatical meaning are selected by using grammatical knowledge as auxiliary means as in the above described process utilizing knowledge. Positive correction of obtained results by feeding back one result to the other is not often carried out.

SUMMARY OF THE INVENTION

Therefore, an object of the present invention is to provide an apparatus for character segmentation which can correctly segment a characters from some hand-written characters which are written close to each other, and to provide an apparatus for character recognition in which the steps for segmentation and recognition of characters can be simplified by using the aforementioned apparatus for character segmentation.

Briefly stated, the present invention provides an apparatus for character segmentation in which characters which have been turned to electronic data are provided as inputs, the fields of induction on the retina of the characters are calculated, character region of individual character is determined by using the fields of induction, and each character is segmented from the array of characters.

Therefore, by the present invention, hand-written characters adjacent to each other can be segmented easily.

The apparatus for character recognition recognizes characters by evaluating quantitatively the difference of the fields of induction on the retina of different characters, based on the magnitude of strain of the field of induction on the retina which strain is generated by deformation of the field of induction on the retina of the segmented character in order to match the field with the field of induction on the retina of a character prepared in advance as a dictionary.

Preferably, a scope for searching a specific closed curve defining the character region is determined based on the calculated field of induction, and the character region is determined based on the determined scope of search.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Prior to description of the embodiments of the present invention, the principle of the present invention will be described. A method of estimating the field of induction on the retina by calculation from digital images of characters which are provided as the result of electronic processing will be described as an example of estimation of the field of induction on the retina of character images based on physiological and psychological knowledge.

Figure 4:
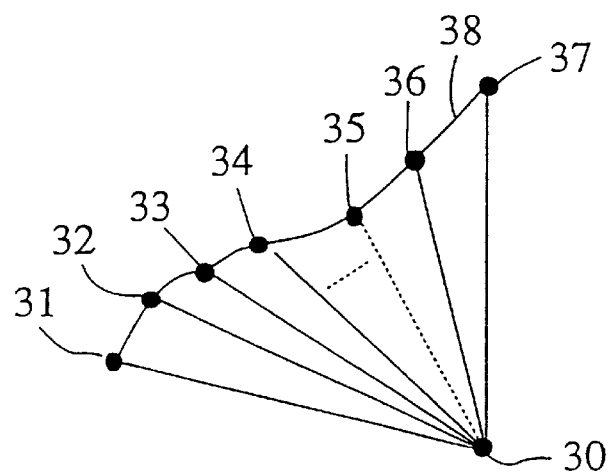
FIG. 4 shows an array of pixels of a digital image.

FIG. 4 shows an array of pixels of a digital image. As shown in FIG. 4, it is assumed that the field of induction on the retina is formed at an arbitrary point 30 by a line 38 which is constituted by an array of n dots 31 to 37. The curve 38 corresponds to a line of a drawing or a contour of a figure. Each point constituting the curve 38 is assumed to be an electric charge with +1. When the points 31 to 37 on the curves 38 are scanned from point 30 and n points constituting the curves 38 are found, the intensity Mp of the field of induction on the retina at the point P corresponding to arvitrary point 30 will be defined by the following equation (1), wherein $r_i$ represents the distance to each point found during scanning:

$$Mp = \frac{1}{n}\sum_{i}^{n} \frac{1}{r_i} \quad (1)$$

By using the equation (1), the field of induction on the retina of an arbitrary digital image can be calculated. Although the phrase "field of induction on the retina" could appear to imply something to do with a viewer of the image, the mathematical definition given for that phrase in equation (1), in the context of FIG. 4, demonstrates that the field of induction is determined from the perspective of an arbitrary point P (30) in the plane of the scanned image. In the equation (1), only the sum of scanning of portions directly irradiated by light emitted from the point P is calculated. It is assumed that portions which are hidden behind other lines when viewed from the point P do not contribute at all. Since such restriction condition exists for the equation (1), scanning of character images must be done carefully.

Figure 5:
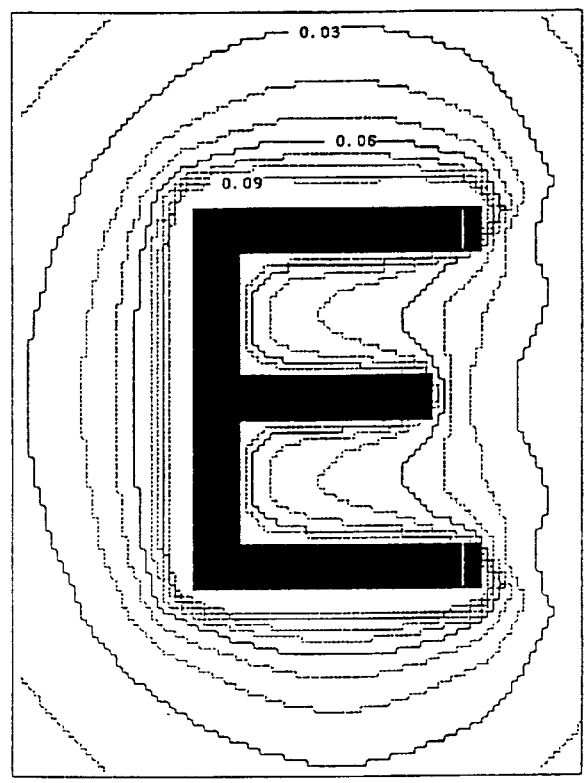
FIG. 5 shows an example of the field of induction on the retina of a character "E".

FIG. 5 shows an example of the field of induction on the retina of a character "E" obtained in accordance with the method of calculation described above. In the following description, every field of induction on the retina will be obtained in accordance with the method of calculation described above. Referring to FIG. 5, the thick line represents the character "E" and lines existing thereabout are contour lines showing or bounding equational potential planes(equal potential planes) each connecting the same intensity of the field of induction on the retina. The numerals in FIG. 5 show the intensity of the field at the equational potential plane. The field of induction on the retina (hereinafter simply referred to as the field of induction) is distributed around a character and the intensity therefore depends on the distance from the character. Namely, the intensity becomes higher as the field is nearer to the character.

First, character segmentation utilizing the field of induction will be described. Some hand-written characters are, in principal, written so that the induction fields of respective characters are separated as much as possible from each other (or the induction fields of respective characters interfere with each other, so as to prevent fusion). Accordingly, it is possible to estimate two-dimensional area of existence of a character by examining the distribution of the fields of induction for the characters. As for the characters used for character segmentation utilizing the field of induction, the characters are extracted from a document by the method using projection, since by this method the characters can be extracted with sufficient precision from a document.

Figure 6:
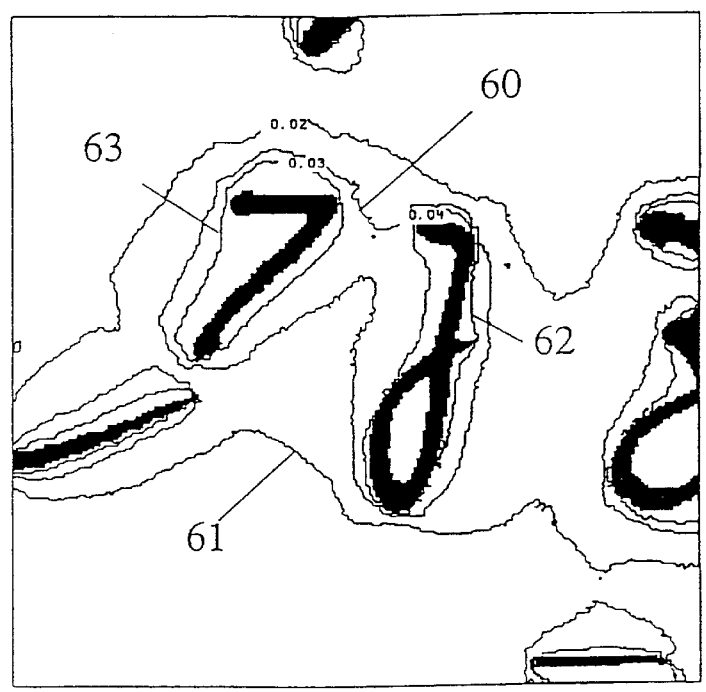
FIG. 6 shows an example of the fields of induction calculated for all pixels other than black pixels of the object image of character images including adjacent characters.

FIG. 6 shows an example of the field of induction calculated for every pixels other than black pixels on the objective image by applying the equation (1) with respect to character images including adjacent characters. By using the equation (1), the fields of induction can be calculated even if the images are deformed and complicated, such as in the case of character images including adjacent characters. Referring to FIG. 6, the components of a character "t" are considerably apart from each other and therefore, it seems that the components are not much related with each other. It seems that the induction fields of the components of the character "t" are fused with the induction fields of components of other characters. However, the actual distribution of the fields of induction shows a different fact. The respective components of the character "t" are enclosed by closed curves 62 and 63 each of which is an equational potential plane. The character "t" is surrounded by a single closed curve 60, defining the region of existence of the character "t". An equational potential plane 61 outside the closed curve 60 includes character components other than the character "t" When equational potential planes around the character "t" are successively examined from those having lower potential value to those having higher potential value, at first the plane is fused with components of other characters near the objective character (equational potential plane 61), the plane becomes smaller gradually, and a closed curve 60 enclosing only one character appears at a certain potential value.

As the potential value becomes higher, if the components of the character "t" are separated from each other, the equational potential planes are also separated (closed curves 62, 63). At this time, the separated closed curves 62 and 63 are enclosed in the closed curve 60 which encloses the character at first. More specifically, there can be seen a hierarchical structure based on the relation of enclosure of the closed curves.

Determination as to whether a closed curve is included or not depends on the position of the closed curve on a two-dimensional plane. Therefore, by calculating the induction fields of character images including adjacent characters, examining equational potential planes having lower to higher potential values successively and by examining the relations between the closed curves, a specific closed curve defining the region of a character can be found.

The following is the reason why a character or a character component exist in the region of a closed curve. The field of induction on the retina which can be understood as a coulomb potential has the nature of a long range interaction or shielding. When a character exists by itself, there is only a closed curve surrounding the character. If there are other components around the character, the field of induction interacts therewith. This interaction is strong if adjacent characters are very close, and becomes weaker as the characters are separated at greater distance. The strength of this interaction can be observed in the form of fusion or separation of the fields of induction. Therefore, the closed curve surrounding the character can be understood as a phenomenon necessarily appearing from the nature of the field of induction on the retina.

Figure 3:
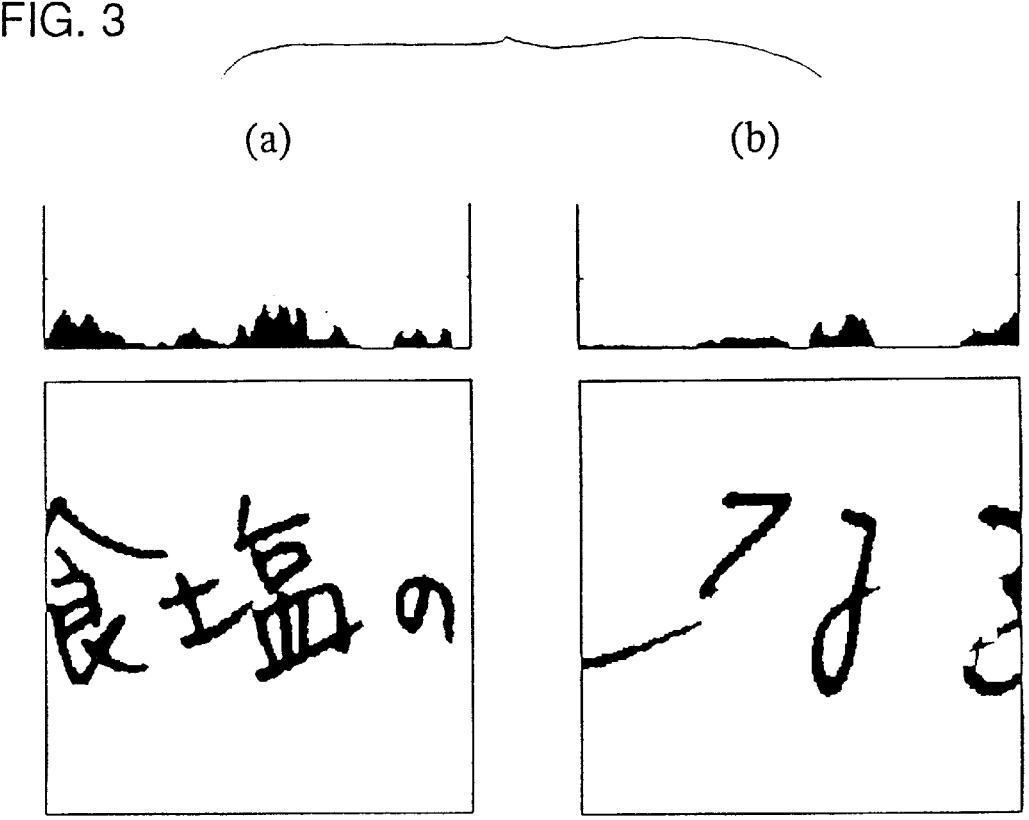
FIGS. 3(a)–(b) shows examples of hand-written characters in which adjacent characters are very close to each other.

As described above, if projections are used as shown in FIG. 3(b), it is impossible to estimate the character region of the character "ţ" from the information of one-dimensional projection only. However, by calculating the fields of induction as shown in FIG. 6 to find the closed curve surrounding the character "ţ", two-dimensional character region of the character "ţ" can be estimated, and accordingly, character segmentation can be done by extracting black pixels in the estimated region.

A principle of character recognition utilizing the field of induction will be described. The distribution of the fields of induction are similar if characters belong to the same category, while the distribution much differs when the characters are different. Similarity of characters caused by deformation of the character can be represented as difference in distribution. Therefore, by quantifying the difference of distribution of the fields of induction, characters can be recognized.

FIGS. 7(a) to 7(d) are illustration showing the principle of character recognition utilizing the difference in distribution of the fields of induction. In considering the difference of distribution of the field of induction of the segmented character, the field of induction is considered as an elastic body such as rubber. When one field of induction is deformed by freely bending or expanding the field such as in the case of rubber in order to make the field match with another field of induction, there is generated a strain in the elastic body. Since the strain becomes larger as the elastic body is deformed to larger extent, the difference between both fields of induction can be quantitatively known by examining the amount of strain. In this embodiment, elastic energy is employed for determining the strain quantitatively.

Assume that there are fields of induction of an unknown pattern and of two reference patterns A and B. When the unknown pattern is deformed to be matched with each of the reference patterns and the elastic energy caused by deformation for respective reference patterns are provided, it can be determined that the reference pattern for which the generated elastic energy is smaller is nearer to the unknown pattern. The contour 100 denotes the unknown character, the contour 101 shows a reference pattern A and the contour 102 shows an equational potential plane at the field of induction of a reference pattern B. FIG. 7(a) shows the state of deformation of the unknown character to be matched with the equational potential plane of the reference pattern A, while FIG. 7(b) shows the state of deformation of the unknown character to be matched with the equational potential plane of the reference pattern B. Since the equational potential plane of the unknown character has distribution closer to pattern A than to pattern B, the degree of deformation is smaller. For character recognition, many reference patterns are prepared and unknown characters are compared with the plurality of reference patterns. The reference pattern which causes the smallest elastic energy of the unknown character to be matched with the reference pattern can be considered as the result of recognition.

Figure 7:
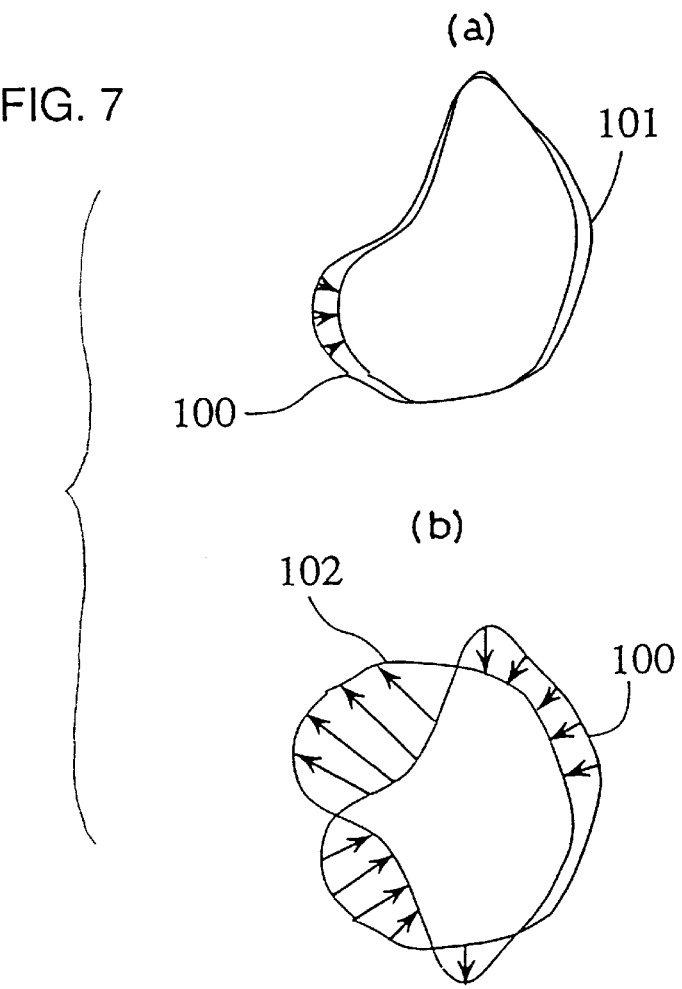
FIGS. 7(a) and (b) are an illustration of the principle for identifying characters utilizing difference in distribution of the fields of induction.
FIG. 7(c) is a three dimensional representation of the field of induction.
FIG. 7(d) shows displacement of a contour on an equational potential plane.
Figure 7C:
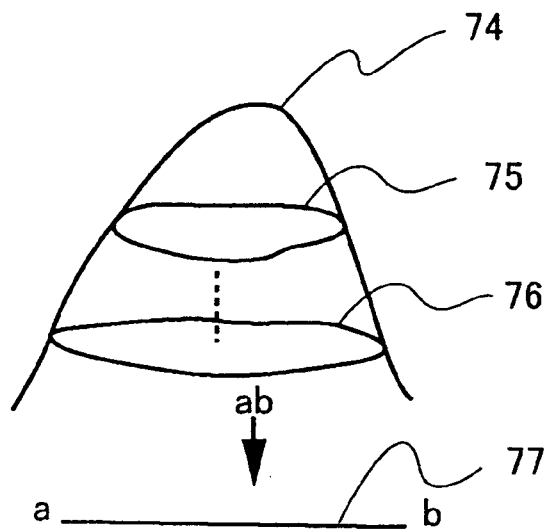

FIG. 7(c) is a three dimensional representation of the field of induction. Since the field of induction is a scalar field on a two-dimensional plane, it can be considered as a three dimensional elastic body 74 as shown in FIG. 7(c). However, since calculation of displacement is difficult when it is considered as a three dimensional body, the three dimensional field of induction is regarded as a gathering of two dimensional equational potential planes 75 and 76 as shown in FIG. 7(c), and strains of respective equational potential planes are calculated and added. Since only the contour should be considered on the equational potential plane, all the calculation can be effected as a problem of one dimensional array of dots 77.

Figure 7D:
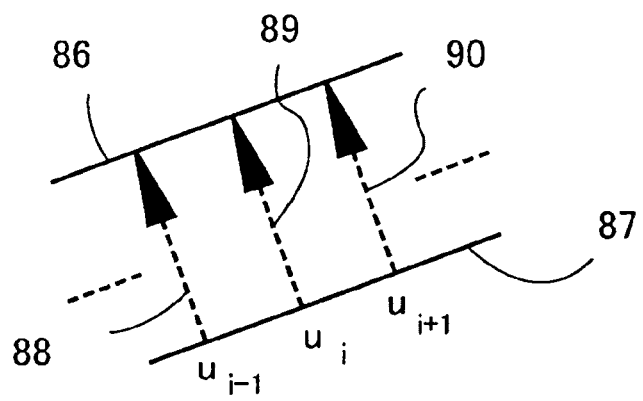

FIG. 7(d) shows displacement of a contour on an equational potential plane. Displacements 88, 89 and 90 generated when various points on border line 87 on an equational potential plane of one character pattern move to border line 86 on the same equational potential character plane of the other pattern are calculated, and elastic energy caused by strains is calculated based on the displacements. This corresponds to calculation of the elastic energy caused by deformation of a membrane extended on a contour. The energy U required for the displacement of the membrane from the equilibrium state to a certain position includes an energy $U_1$ required for the deformation of the membrane and the energy $U_2$ required for the deformation of the contour, which is the edge of the membrane. Respective energies can be calculated in accordance with the following equations.

$$U_1 = \alpha \int \int (u_x^2 + u_y^2) dx dy \quad \left(\alpha = \frac{\tau}{2}\right) \tag{1A}$$

wherein τ represents tension uniformly applied to the membrane.

$$U_2 = \frac{B}{2} \int u_{ss}^2 ds \quad \left(B = \frac{\tau^2}{p^2} C\right) \tag{1B}$$

where p represents the density of the membrane of and C represents a uniform elastic coefficient.

Since $u_1 = u(x(i), y(i))$, the following differential expressions can be obtained.

$$u_x \,_{\partial u_i/\partial x} = x(i) - x(i-1) \tag{1C}$$

$$u_y = \partial u_i/\partial y = y(i) - y(i-1) \tag{1D}$$

$$u_{xx} = \partial u_x/\partial x = x(i+1) - 2x(i) + x(i-1) \tag{1E}$$

$$u_{yy} = \partial u_y/\partial y = y(i+1) - 2y(i) + y(i-1) \tag{1F}$$

$$u_{ii}^2 = u_{xx}^2 + u_{yy}^2 \tag{1G}$$

The displacement $u_1$ can be calculated for the entire contour, and by using the differential expressions (1C) to (1G) above, the elastic energy $U = U_1 + U_2$ generated by the displacement can be calculated in accordance with the equations (1A) and (1B).

Assume that fields of induction of a plurality of categories are prepared as a dictionary. Let us represent an elastic energy generated when an unknown pattern is deformed to match a certain dictionary category i on an equational potential plane at the potential value of P as $e_i$ (P). In this embodiment, a method for recognition simply by the total elastic energy will be described. The total energy $E_1$ necessary for matching of the two patterns is represented as $$E_i \int_o^1 e_i(p) dp \tag{1H}$$

Since the value of $E_i$ becomes smaller as the category i is closer to the unknown pattern, discrimination is done by determining a category i which satisfies $$\min E_i$$

for all the categories i. The elastic energy $E_i$ (P) is a function of the potential value P. Therefore a method in which discrimination is carried out by using an evaluating function of a certain potential value P is also possible.

Specific embodiments of the apparatus for character segmentation and the apparatus for character recognition in accordance with the present invention will be described.

Figure 1:
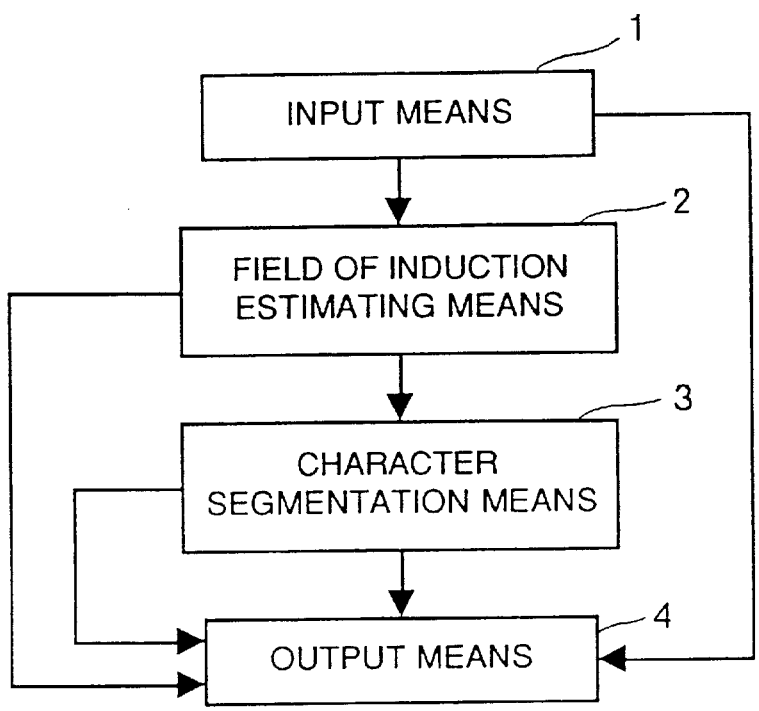
FIG. 1 is a schematic diagram showing a structure of the apparatus for character segmentation in accordance with the present invention.

FIG. 1 is a schematic block diagram showing one embodiment of the apparatus for character segmentation in accordance with the present invention. Referring to FIG. 1, input means 1 receives characters which have been turned to electronic data as inputs, and the input character data are applied to field of induction estimating means 2. The field of induction estimating means 2 calculates the fields of induction on the retina of the character images input from input means 1, and applies the result of calculation to character segmentation means 3. Character segmentation means 3 segments are individual character from a plurality of characters by using the fields of induction on the retina which are formed by the plurality of characters and calculated by the field of induction estimating means 2. Output results and states of input means 1, the field of induction estimating means 2 and of character segmentation means 3 are displayed on output means 4.

Figure 2:
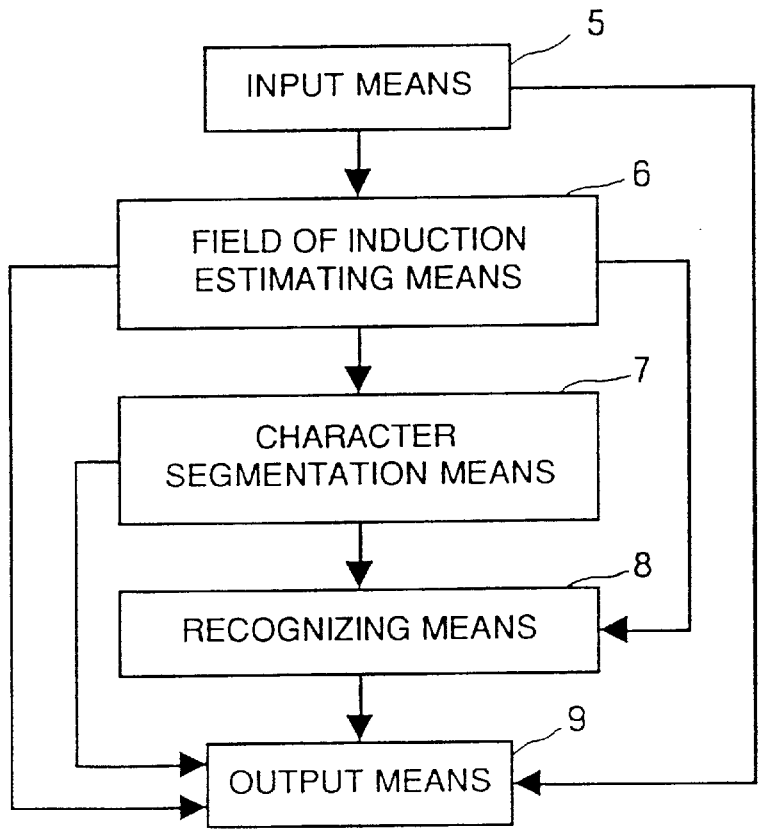
FIG. 2 is a schematic block diagram showing a structure of an apparatus for character recognition in accordance with the present invention.

FIG. 2 is a schematic block diagram of one embodiment of the apparatus for character recognition in accordance with the present invention. Referring to FIG. 2, the structures of input means 5, field of induction estimating means 6 and character segmentation means 7 are approximately the same as those of input means 1, field of induction estimating means 2 and character segmentation means 3 of FIG. 1. The apparatus for character recognition further includes recognizing means 8 for carrying out character recognition by using the fields of induction on the retina of characters segmented by character segmentation means 7. The output results and states of input means, field of induction estimating means 6, character segmentation means 7 and of recognition means 8 are displayed on output means 9.

Figure 8:
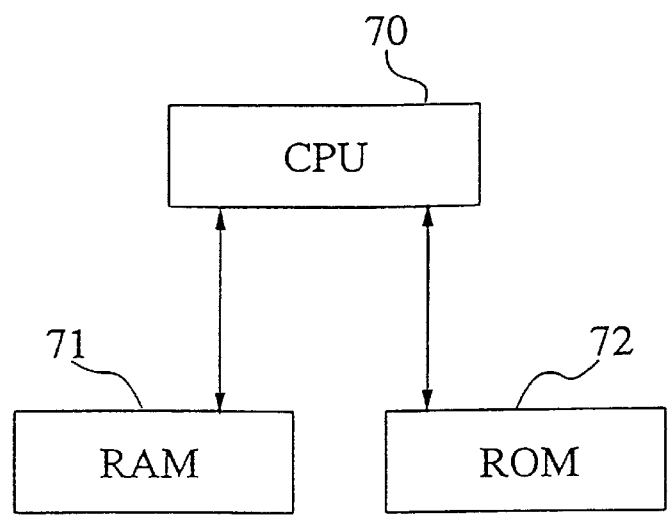
FIG. 8 shows a general electric structure of one embodiment of the character recognizing apparatus and of the character segmentation apparatus in accordance with the present invention.

FIG. 8 shows a general electric structure of the apparatus for character segmentation and on the apparatus for character recognition. Referring to FIG. 8, a CPU 70 carries out estimation of the fields of induction on the retina, character segmentation and character recognition by the field of induction estimating means 2 and character segmentation means 3 shown in FIG. 1 and by the recognizing means 8 shown in FIG. 2; character data to be recognized and data related to character segmentation and related to the process of recognition are temporarily stored in the RAM 71; and programs and the like necessary for character segmentation and recognition are stored in the ROM 72.

Since processes for character segmentation are common in the apparatus for character recognition and in the apparatus for character segmentation, the operation of the apparatus for character recognition will be described.

Figure 9:
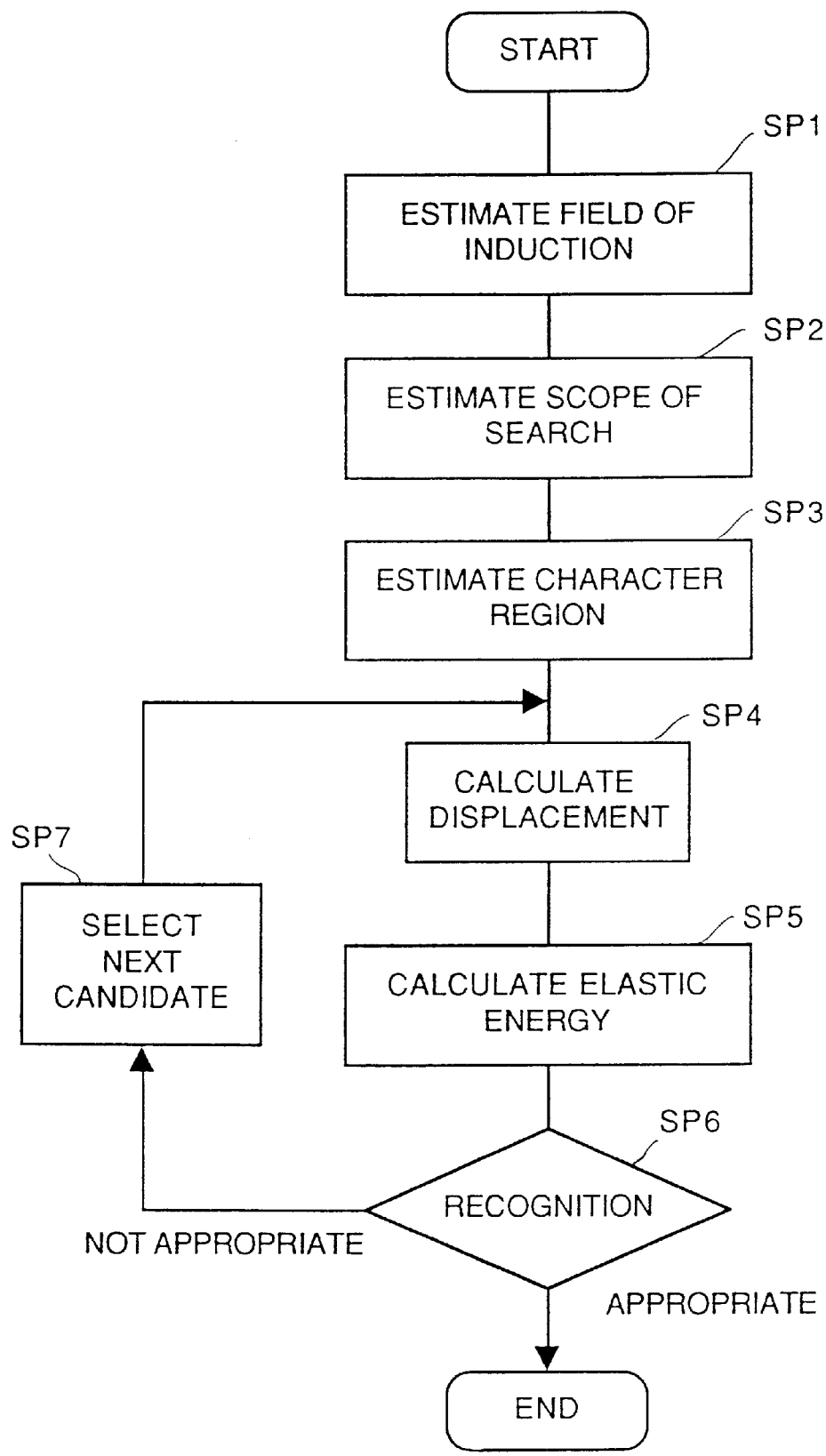
FIG. 9 is a flow chart showing the operation of one embodiment of the character recognizing apparatus of the present invention.
Figure 10:
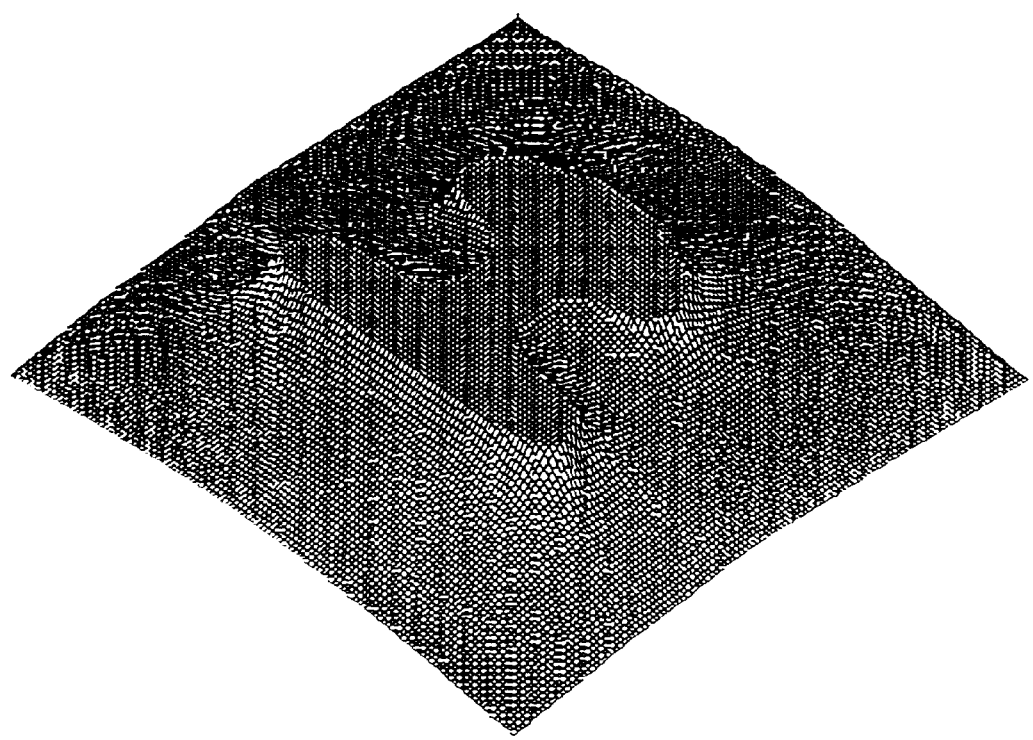
FIG. 10 shows the field of induction viewed as a three-dimensional figure.
Figure 11:
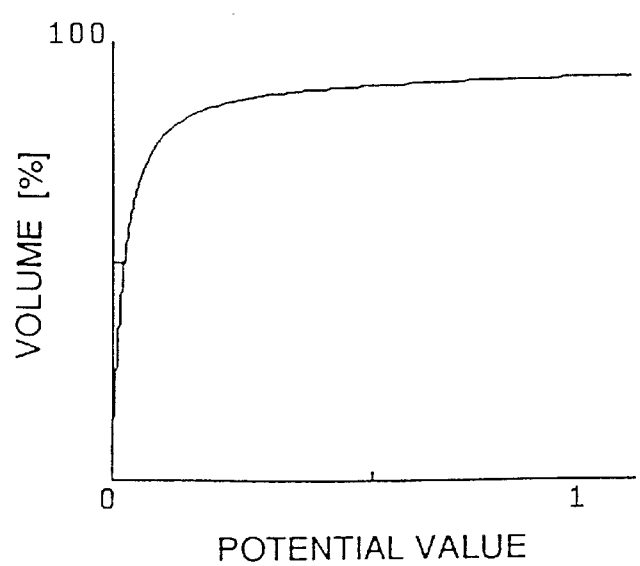
FIG. 11 is a graph showing the result of calculation of the volume of water which can be poured into the three-dimensional figure when it is assumed that the three-dimensional figure is put in a container having the same bottom area and that the water is poured to a certain potential level.
Figure 12:
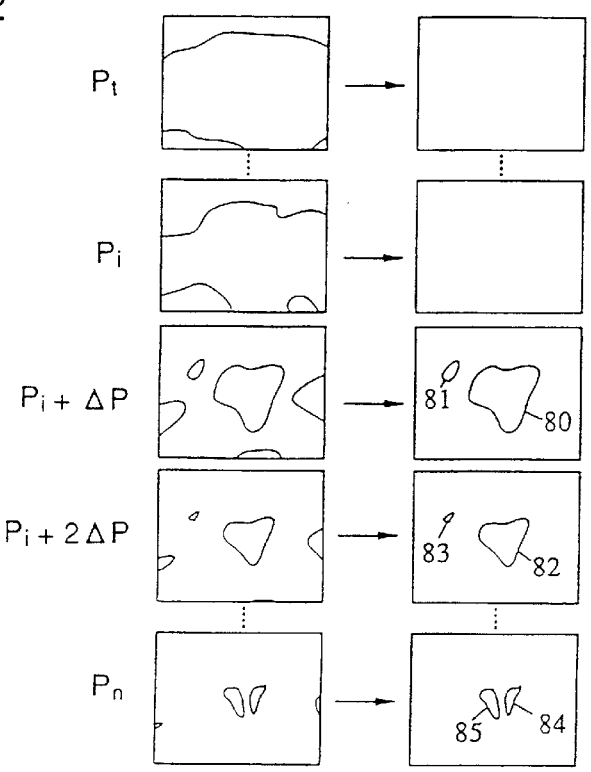
FIG. 12 shows an example of extraction of closed curves by examining distribution of equational potential planes successively from lower to higher potential values.
Figure 13:
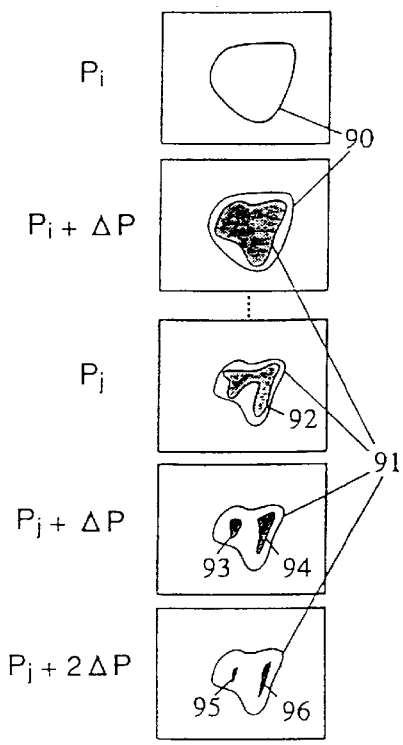
FIG. 13 shows closed curves extracted by increasing the potential value $P_i$ of the initially extracted closed curve by $\Delta P$.

FIG. 9 is a flow chart showing the operation of one embodiment of the apparatus for recognizing characters in accordance with the present invention, FIG. 10 shows an example of the field of induction on the retina viewed as a three dimensional figure, FIG. 11 shows an example of calculation of the volume of water which can be poured assuming that the three dimensional figure of FIG. 10 is put in a container having the same bottom area and that the water is poured to a certain potential level, FIG. 12 shows an example of extraction of closed curves by examining distributions of equational potential planes successively from lower to higher potential values, and FIG. 13 shows an example of closed curves extracted by gradually increasing the potential value Pi of the first extracted closed curve by ΔP.

A specific operation of one embodiment of the present invention will be described with reference to FIGS. 2 and 8 to 13. As for the character images treated in this embodiment, it is assumed that strokes of characters are not in contact with each other, not crossed with each other and not overlapped with each other, that only one complete character exists in the data of the array of characters and other existing data are only of components of other characters.

When an array of hand-written characters is input through input means 1, CPU 70 calculates the fields of induction of the input character images based on the equation (1) and carries out estimation in step SP1 (in the figures simply labeled by SP). Then, in step SP2, CPU 70 determines a scope for searching a specific closed curved defining the character region. Since the field of induction on the retina is a scalar potential on a two-dimensional plane, the field of induction can be regarded as a three dimensional figure as shown in FIG. 10. Assume that the three dimensional figure is put in a container having the same bottom area and water is poured to a certain level of the potential value. The volume of water which can be poured is as shown in FIG. 11. The ordinate of FIG. 11 shows the ratio of the water volume which can be poured to a certain potential level with the volume of water poured in a vacant container being considered as 100%, and the abscissa represents the potential value. The ratio of volume at which the character is separated by a certain closed curved is within the range of about 40 to 70% as known from segmentation experiments. In other words, it is not necessary to search the closed curve on every potential plane. Accordingly, the relation between the volume of the three-dimensional figure and the potential value is calculated as shown in FIG. 11 for the objective array of character data, and the range of potential values in which the volume is within 40 to 70% is determined to be the object of search for the closed curves.

Then, CPU 70 searches the closed curve in the determined range of the potential value in step SP3. As shown in FIG. 12, the distribution of equational potential plane is examined from lower to higher potential values to extract closed curves. When the potential value is low and the equational potential plane is at an edge of the character image, it is not regarded as a closed curved. The potential value is gradually increased, and a closed curve existing solely without touching the edge is searched. Every time a closed curve is extracted, it is labeled. For example, referring to FIG. 12, two closed curves 80 and 81 appear for the first time when the potential value is increased from $P_i$ by $\Delta P$.

Assume that a plurality of closed curves satisfying the following relation of enclosure are obtained with the potential value being gradually increased by $\Delta P$. The closed curves 80, 81, 82, 83 and 84 are represented as A, B, $a_1$, $b_1$, $a_{12}$ and $a_{11}$, respectively.

$$A \supset a_1, a_1 \supset a_{11}, \supset a_{12} \tag{2}$$

$$B \supset b_1 \tag{3}$$

When the initially extracted closed curves are represented as A and B and closed curves included in A and B are represented as $a_{ijk}$ ... and $b_{ijk}$ ... as in this example, the relation of enclosure is represented as follows (i, j, k are integers).

$$a_i \in A, a_{ij} \in a_i, a_{ijk} \in a_{ij}, \ldots \tag{4}$$

$$b_i \in B, b_{ij} \in b_i, b_{ijk} \in b_{ij}, \ldots \tag{5}$$

Thus a group of closed curves arranged hierarchically dependent on the relation of enclosure, with the initially extracted closed curves A and B being the origin, can be obtained.

Then, a group of closed curves including a character is selected. Areas and perimeters of the groups of closed curves each including a part of a character or noise are smaller as compared with those of the group of closed curves surrounding a character. It is possible to evaluate and determine a group of closed curves including a character by a function $f(x_i)$ for effecting quantitive evaluation of a plurality of groups of closed curves $x_i$, with the groups of closed curve represented as A, B, C, D, . . . . Generally, there are a plurality of groups of closed curves including characters. As it is assumed that only one complete character is included, the character region can be determined by the group of closed curves represented by the following equation (6).

$$\mathrm{maxf}(A, B, C, D \ldots) \quad (6)$$

Finally, a closed curve optimal for character segmentation is estimated from the selected group of closed curves. Since there is a possibility that the strokes of the character are separated, the existing region of the character is determined in the following manner. More specifically, as shown in FIG. 13, a closed curve is extracted when the potential value $P_i$ of the first extracted closed curve 90 is increased by $\Delta P$. When the potential value attains $P_i + \Delta P$, there appears a plurality of closed curves. These closed curves 93 and 94 and closed curves 95 and 96 are considered to indicate portions of components of the character.

Closed curves 93 and 94 as well as 95 and 96 are supposed to be parts of a character. The reason is as follows. When a closed curve 92 at the potential value $P_j$ is separated into closed curves 93 and 94 at the potential value of $Pj+\Delta P$, the sum of perimeter and area of closed curves 93 and 94 is considerably reduced as compared with the perimeter and area of the closed curve 92. Generally, the area and perimeter of the closed curve decreases as a potential value increases. When a character is separated into parts or when a character includes a noise, the area and perimeter are considerably reduced. For example, it is apparent that the area and perimeter of the closed curve is much reduced when we compare the closed curve 60 and the separated closed curves 63 and 62 of FIG. 6. The rate of reduction can be experimentally obtained (in the similar manner as the volume mentioned in page 22, lines 21 to 24 of the specification). Therefore, it is determined that a character, not separated into fragments, exists in the closed curve between the potential values Pi and Pj. Therefore, a character exists with its components not separated in the closed curve between the potential values $P_j$ and $P_i$, at which only a single closed curve exist. Since the closed curve most limiting the existing region of the character is the closed curve 92 at the potential value $P_j$ immediately before the appearance of the plurality of closed curves, the closed curve 92 is regarded as the existing region of the character. Segmentation of a character is enabled by finding black pixels existing in thus determined closed curve 92.

Character segmentation is completed in this manner, and character recognition is carried out successively. In this embodiment, the fields of induction are used in character recognition as in character segmentation.

In step SP4, CPU 70 calculates displacement generated when the field of induction of the segmented character deforms to be matched with the field of induction of a certain dictionary pattern which has been stored in advance in ROM 72. Since the field of induction of the segmented character has been already obtained, the result of segmentation can be directly used for recognition without any separate processing such as feature extraction. Even if the field of induction is to be calculated again, it is not necessary to calculate the fields near the character components and only the outside of the already provided segmented closed curve is to be searched.

In step SP5, CPU 70 calculates elastic energy based on the displacement thus obtained. In step SP6, whether or not the segmented character has the same pattern as the dictionary pattern which is being referred to is determined based on the magnitude of the calculated elastic energy and if it is proper to consider the segmented character as the same as the dictionary pattern, the process is terminated. If not, a different dictionary pattern is selected as a candidate in step SP7, and displacement and elastic energy are calculated again for identification.

In this manner, different between fields of induction of the segmented character pattern and of each dictionary pattern prepared in advance in the form of elastic energy is successively evaluated to find a proper dictionary, and thus identification is done. Since segmentation and recognition of characters can be carried out through constant processing using the fields of induction, it is not necessary to go through completely different process steps of segmentation using projections and recognition using feature extraction as in the general character recognition system. Therefore, the structure of the character recognizing apparatus can be simplified.

Figure 14:
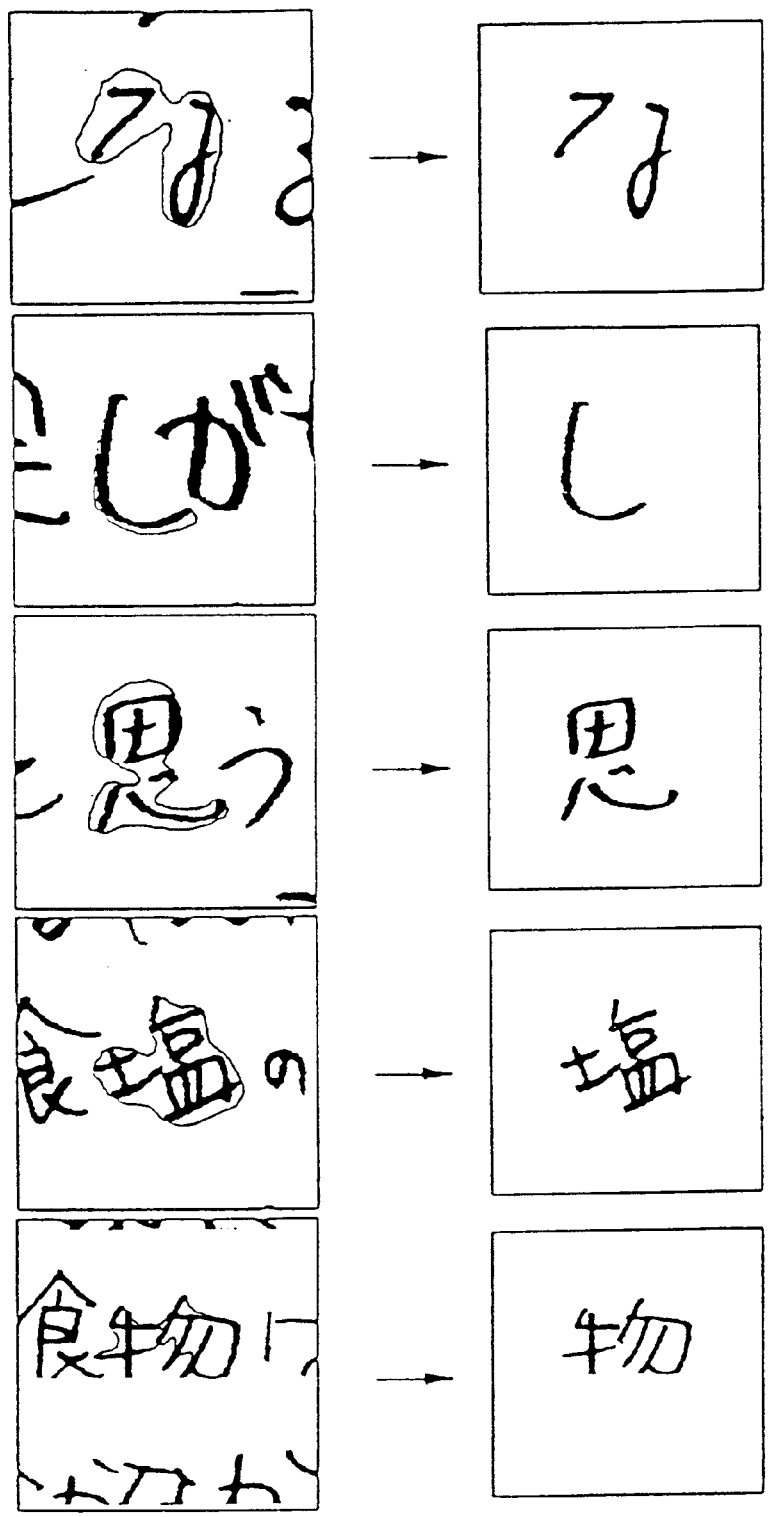
FIG. 14 shows some results of character segmentation carried out in accordance with the method of one embodiment from actual arrays of hand-written characters.
Figure 15:
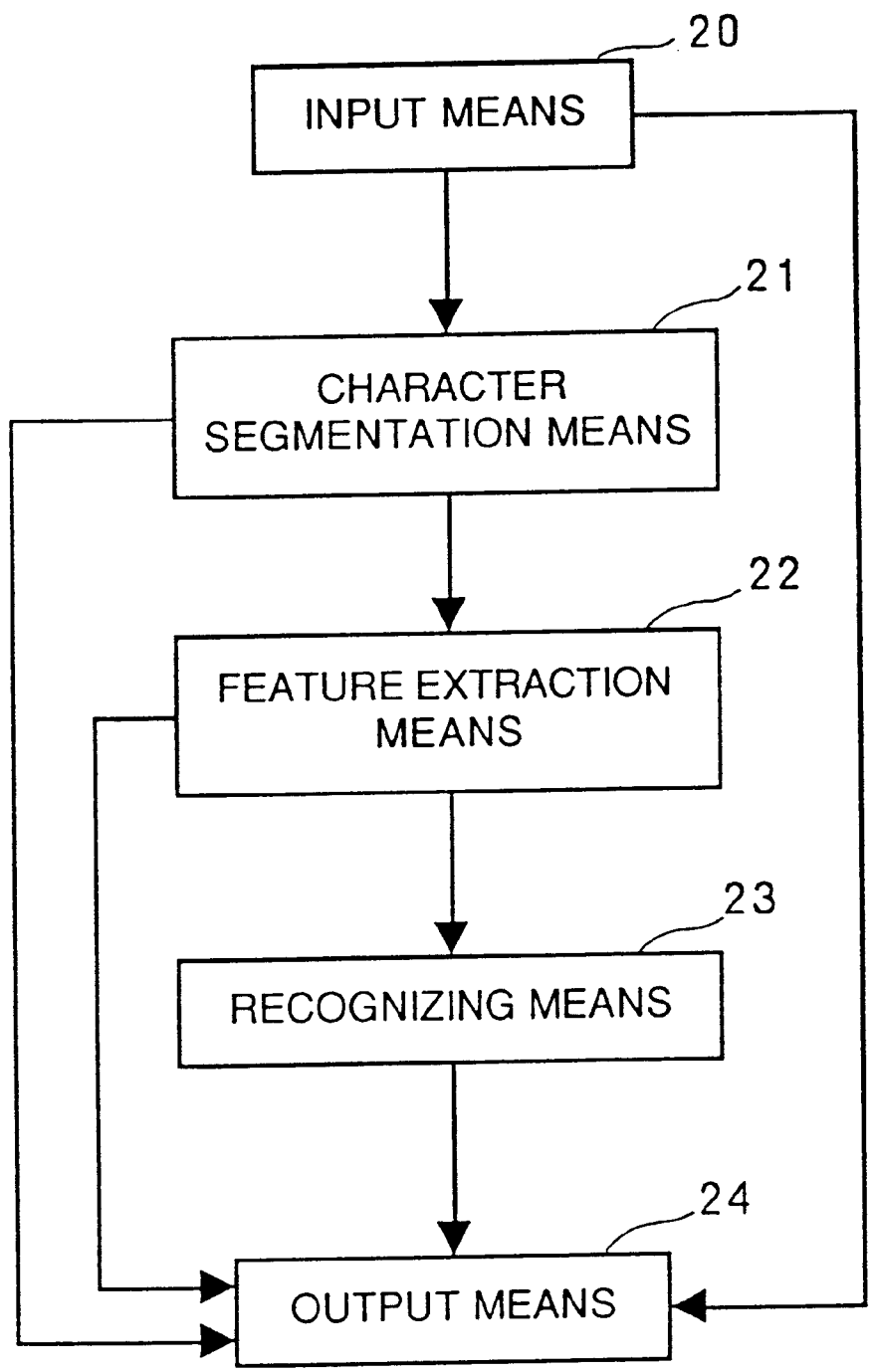
FIG. 15 is a schematic block diagram showing one example of a conventional apparatus for character recognition.

FIG. 14 shows some results of character segmentation based on the method of this embodiment from actually hand-written arrays of characters.

All these characters could not be segmented only by using projections of the character images. It can be understood that this character can be segmented by the method of the invention since two-dimensional character regions are defined only by the closed curves of the fields of induction on the retina. In this embodiment, since it is assumed that only one complete character is included in the character data in principle, a closed curve extracted at first and having the longest perimeter is selected as the closed curve including the character. Since the existing region of the character is defined two-dimensionally, there is no such a problem as in the prior art, that is, components of other characters are included when a character is one-dimensionally segmented forcefully by using projections. Therefore, recognition ratio is not degraded when the recognition is carried out based on the result of segmentation.

When there are a plurality of characters existing in the character images, there are a plurality of groups of closed curves defining scope of individual characters. In such a case, by excluding groups of closed curves which seem to include noise or part of character components from the extracted group of closed curves dependent, for example, on the perimeter of the closed curves, the remaining group of closed curves can be regarded as including characters. Therefore, by using these groups of closed curves, a plurality of characters can be segmented in the similar manner as in the case described above. The groups of closed curves corresponding to noise or a part of character component generally has such nature as very short perimeter of the curve, a small potential energy and so on as compared with the group of closed curves including whole characters, and therefore they can be distinguished.

Since completely the same process steps are carried out for segmentation and recognition of characters, the result of recognition can be easily reflected to character segmentation, and therefore the ability of character recognition of the apparatus for character recognition employing knowledge as a whole can be easily improved.

For example, assume that a result of character recognition does not correspond to any of the dictionary patterns as deformation at a right hand portion is quite large. It may be derived from insufficient character segmentation. More specifically, there is a possibility that a part of a character or character component on the right side of the character in question could have been fused and erroneously segmented. In such a case, the state of the field of induction of the original characters from which the character has been segmented should be re-examined specially focused on the right side field of induction of the segmented character, and by such re-examination, optimal character segmentation becomes possible. When recognition is carried out using the fields of induction, what portion deforms how much can be known quantitatively as shown in FIG. 7. Therefore, the scope to be re-examined for character segmentation can be estimated based on the quality of deformation.

As described above, according to the embodiment of the present invention, fields of induction on the retina generated by characters included in character images are estimated based on physiological and psychological knowledge, the fields of induction on the retina are examined successively from lower potential values to higher potential values, two-dimensional existing region of characters is estimated based on the change of distribution (based on existence of a single closed curve) and character segmentation is done based on the estimation. Therefore, characters of an array of hand-written characters written close to each other, which could not be easily segmented by using projections of character images, can be appropriately segmented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for segmenting a desired character from an array of characters, comprising:

an input receiving an array of characters represented as electronic data;

a computer configured to calculate a field of induction at points within a proximity of said array of characters and for determining a character region of each character by using fields of induction for segmenting a character from the array of characters; and an output containing electronic data representing individual characters from said array of characters.

2. The apparatus of claim 1, wherein said computer is configured to search for a character region using at least one closed curve joining points of substantially equal values of said field of induction.

3. An apparatus for character recognition which segments a desired character from an array of characters and which recognizes the segmented character, comprising:

an input receiving an array of characters represented as electronic data;

a computer configured to calculate a field of induction at points within a proximity of said array of characters and for determining a character region of each character using fields of induction for segmenting a character from the array of characters; and in which said computer is further configured to recognize a character by quantitatively evaluating differences in shape between fields of induction of different characters, based on a magnitude of strain required to modify the field of induction of an unknown character to match a field of induction of a character prepared in advance as a member of a reference set of characters, using an elastic model, and an output containing electronic data representing individual characters from said array of characters.

4. The apparatus for character recognition according to claim 3, wherein said computer is configured to search at least one specific closed curve joining points of substantially equal values of said field of induction.

5. A method of segmenting characters in an electronic image of text containing pixels, comprising the steps of:

a. selecting at least a portion of said image;

b. determining within said portion, a field of induction at a plurality of points; and c. determining character boundaries using values of said field of induction.

6. The method of claim 5 in which the step of determining character boundaries further comprises the step of joining adjacent points of said plurality of points having substantially the same field of induction value into a curve.

* * * * *